United States Patent [19]

Hotea et al.

[11] Patent Number: 5,450,514
[45] Date of Patent: Sep. 12, 1995

[54] OPTICAL WAVEGUIDE TERMINATING SLEEVE USABLE WITH OPTICAL WAVEGUIDE CONNECTORS

[75] Inventors: Gheorghe Hotea, Griesheim; Johann Kilzer, Neu-Isenburg, both of Germany

[73] Assignee: The Whitaker Corporation, Wilmington, Del.

[21] Appl. No.: 181,725

[22] Filed: Jan. 18, 1994

Related U.S. Application Data

[63] Continuation-in-part of Ser. No. 945,978, Nov. 16, 1992.

[30] Foreign Application Priority Data

Jun. 17, 1992 [DE] Germany ............... 42 19 901.8

[51] Int. Cl.[6] ............................................. G02B 6/36
[52] U.S. Cl. ............................... 385/87; 385/79; 385/55; 385/61; 385/70
[58] Field of Search ................. 385/87, 55, 61, 62, 385/68, 70, 88–94, 79

[56] References Cited

U.S. PATENT DOCUMENTS

| | | | |
|---|---|---|---|
| 4,134,641 | 1/1979 | Kao et al. | 385/84 X |
| 4,186,996 | 2/1980 | Bowen et al. | 350/96.20 |
| 4,421,383 | 12/1983 | Carlsen | 385/79 |
| 4,447,121 | 5/1984 | Cooper et al. | 385/87 |
| 4,534,616 | 8/1985 | Bowen et al | 385/79 |
| 4,648,688 | 3/1987 | Ashman et al. | 385/87 X |
| 4,730,890 | 3/1988 | Kashimura et al. | 385/87 |

FOREIGN PATENT DOCUMENTS

| | | |
|---|---|---|
| 0032722 | 7/1981 | European Pat. Off. . |
| 0095280 | 11/1983 | European Pat. Off. . |
| 2334969 | 7/1977 | France . |

OTHER PUBLICATIONS

159 Instruments & Control Systems vol. 53 (1980) May, No. 5.
Optical Spectra Oct. 1980, pp. 41, 42.

*Primary Examiner*—Frank Gonzalez
*Assistant Examiner*—Phan T. H. Palmer
*Attorney, Agent, or Firm*—Eric J. Groen; Driscoll A. Nina; Adrian J. LaRue

[57] ABSTRACT

A terminating sleeve for optical waveguides, having disposed at its distal end an optical waveguide insertion opening leading into an optical waveguide receiving channel disposed in the longitudinal direction in the terminating sleeve, the terminating sleeve being formed integrally with a coupling means disposed at the proximal end and serving for coupling and uncoupling light, the optical waveguide receiving channel extending from the optical waveguide insertion opening up to the coupling means and the terminating sleeve inclusive of the coupling means being made from an optically transparent material.

36 Claims, 12 Drawing Sheets

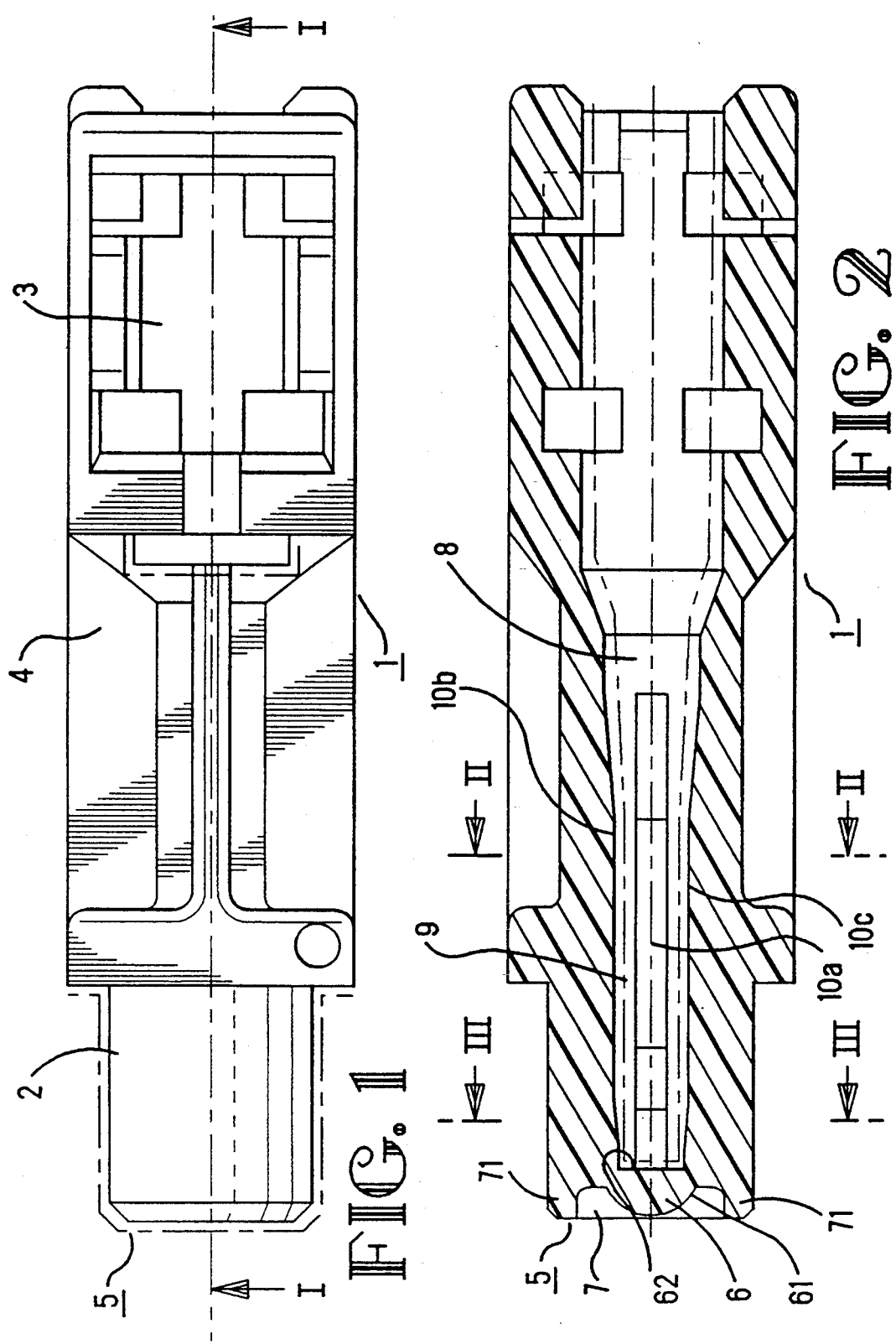

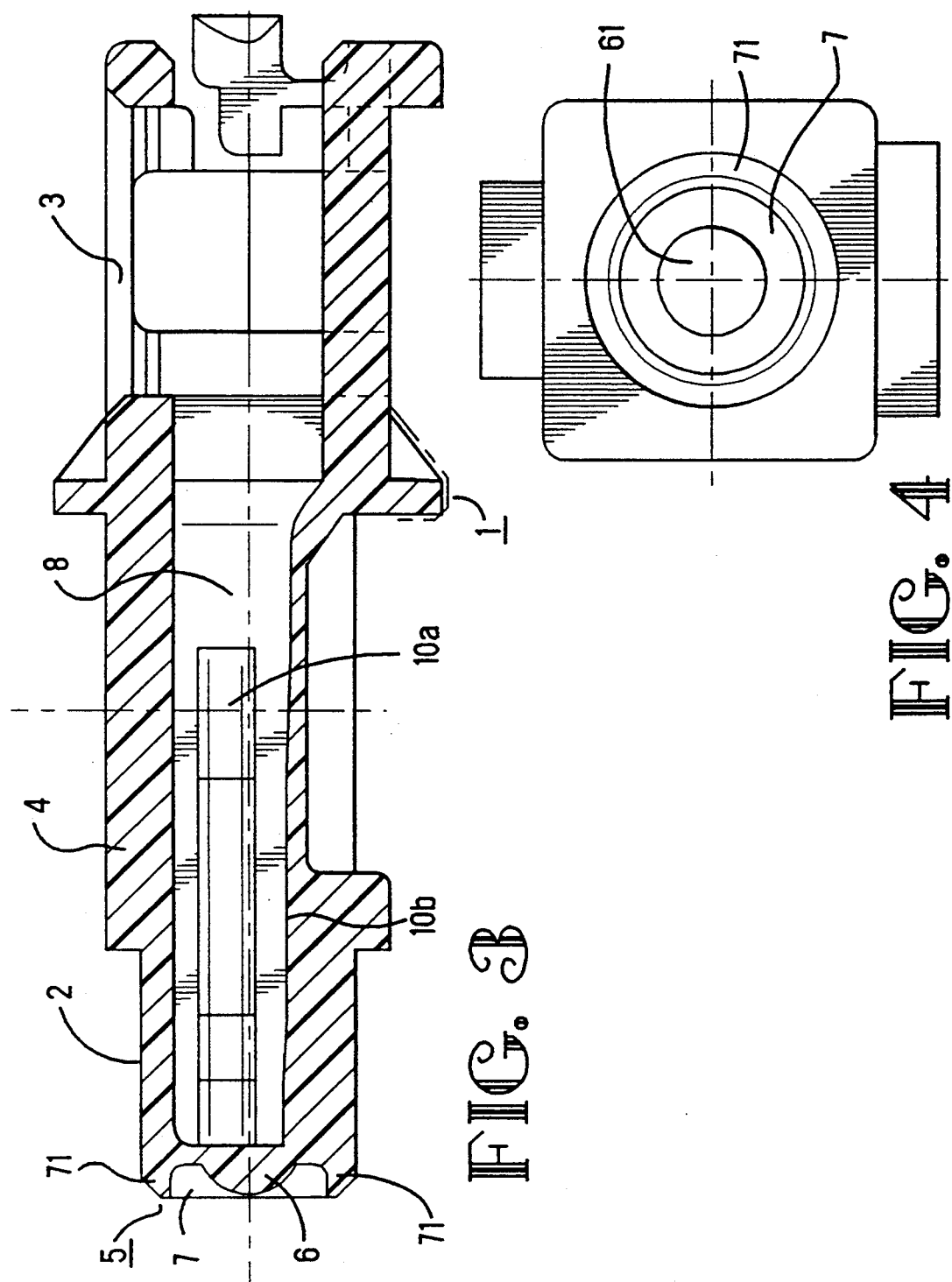

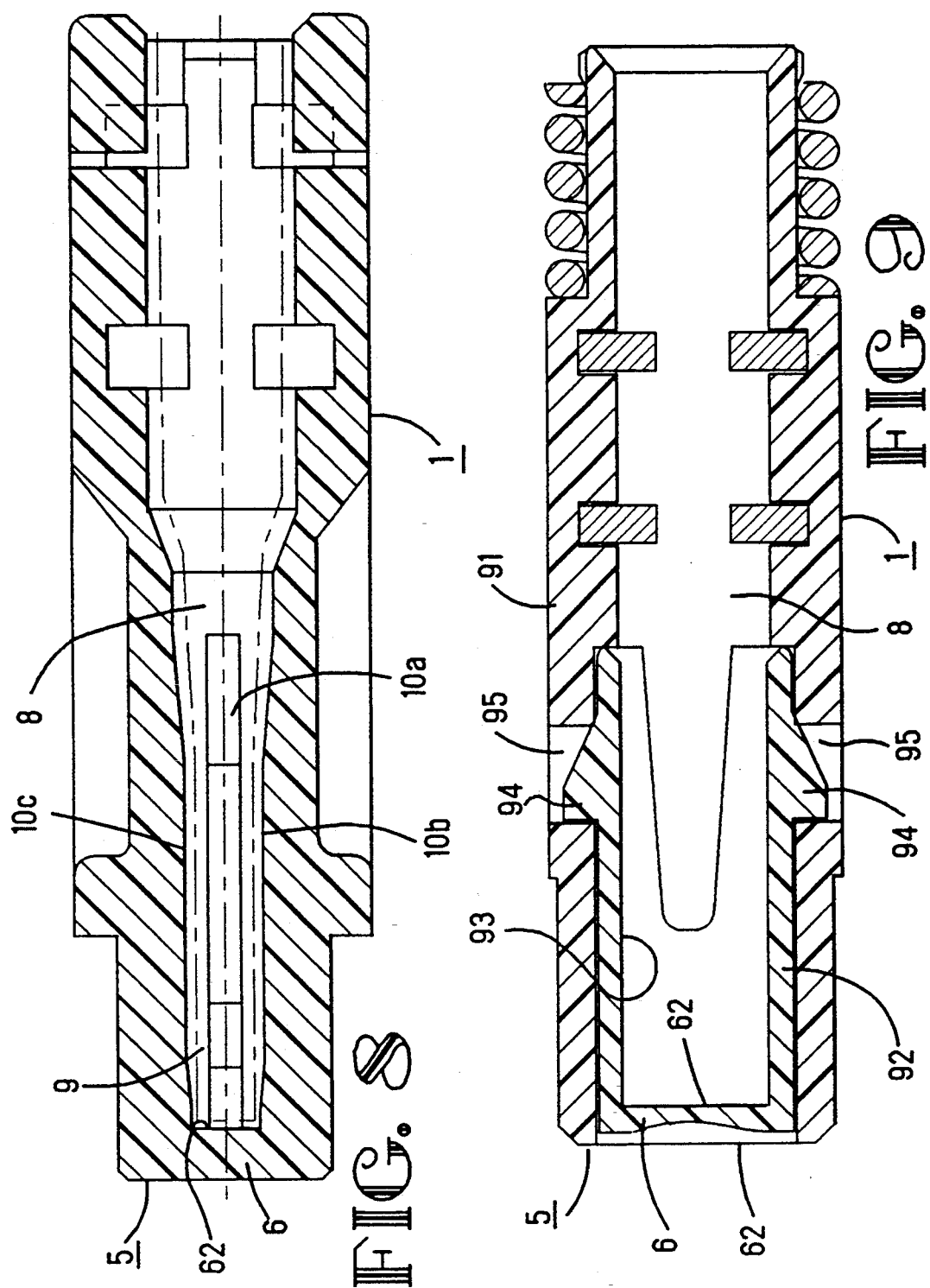

OPTICAL WAVEGUIDE TERMINATING SLEEVE USABLE WITH OPTICAL WAVEGUIDE CONNECTORS

This application is a continuation-in-part application of application Ser. No. 07/945,978 filed on Nov. 16, 1992.

BACKGROUND OF THE INVENTION

1. Field of the Invention

The invention relates to an optical waveguide terminating sleeve usable for optical waveguide connectors, as well as to an optical waveguide connector for coupling optical waveguides with each other and for coupling optical waveguides with optical or optoelectronic components. The term "optical waveguide" will be abbreviated in the following by "OWG".

2. Description of the Prior Art

Just as with electrical conductors, there is a need, also with respect to OWGs, for inexpensive, functionally reliable connectors which can be used either for coupling OWGs with each other by holding the ends thereof to be coupled in closely confronting relationship to each other or which can be used for coupling OWGs with light emitting or light receiving optical or optoelectronic components by holding the ends of the OWGs in closely confronting relationship to the optically transmitting or receiving areas of optoelectronic components.

In order to keep light transmission losses in pluggable connections for OWGs as low as possible, care must be taken that the OWGs to be coupled are as exactly as possible centered with respect to each other or with respect to the optoelectronic components, respectively, and that the areas to be optically coupled are held as parallel and close to each other as possible. Due to the small diameter of usual OWGs, very high accuracy of the mutual radial positioning of the OWGs to be coupled to a pluggable connection is necessary. In using conventional technologies for OWG connections, it turns out almost impossible, in particular for connectors having a plurality of OWGs, to ensure this exact radial and axial positioning.

To overcome this problem, the prior German Patent Applications P 41 06 594.8 and P 41 41 009.2 have suggested terminating devices each comprising a sleeve-like terminating member—referred to as "terminating sleeve" herein—which is provided with a through-opening having an OWG length or section firmly disposed in its one end, with an end portion of the OWG to be terminated being insertable into the other end thereof substantially up to said OWG section. The disclosure contents of the aforementioned prior applications is incorporated herein by making reference thereto.

Preferably both the OWG section and the OWG to be terminated consist of optically highly transparent plastics material, for instance acrylic glass. The terminating sleeve usually consists of optically non-transparent plastics materials. The subject matters of the aforementioned prior patent applications thus require an assembling operation in which the optically non-transparent terminating sleeve is provided with an OWG section establishing the optical interface both to the OWG to be terminated and to the complementary section of the pluggable connection. In particular in the light of mass production of such pluggable connections, there is a need to further simplify the manufacture and assembly of such pluggable connectors.

SUMMARY OF THE INVENTION

It is thus an object of the invention to suggest a terminating sleeve for an OWG as well as an OWG connector which are advantageous in comparison with the subject matters of the afore-mentioned prior patent applications, in particular in terms of easier manufacture, assembly and improved transmission characteristics.

According to the invention, this object is met for a terminating sleeve according to the generic clause of patent claim 1 by the features indicated in the characterizing part thereof. Dependent claims 2 to 10 indicate advantageous developments of the terminating sleeve. Patent claim 11 indicates an OWG connector comprising a terminating sleeve according to any one of claims 1 to 10.

The OWG terminating sleeve according to the invention and the OWG connector equipped therewith are used mainly for bidirectional light transmission.

BRIEF DESCRIPTION OF THE DRAWINGS

FIG. 1 shows a plan view of a first embodiment of a terminating sleeve according to the invention;

FIG. 2 shows a longitudinal sectional view of the terminating sleeve of FIG. 1 along sectional line I—I;

FIG. 3 shows a longitudinal sectional view of the terminating sleeve of FIG. 1 along sectional line I—I in FIG. 1, with the sectional plane being rotated by approx. 90° with respect to that of FIG. 2;

FIG. 4 shows a plan view of the terminating end of the terminating sleeve illustrated in FIG. 1;

FIG. 8 shows a longitudinal sectional view of a second embodiment of a terminating sleeve according to the invention;

FIG. 9 shows a longitudinal sectional view of a third embodiment of a terminating sleeve according to the invention;

DETAILED DESCRIPTION OF THE PREFERRED EMBODIMENT

Figure 5:
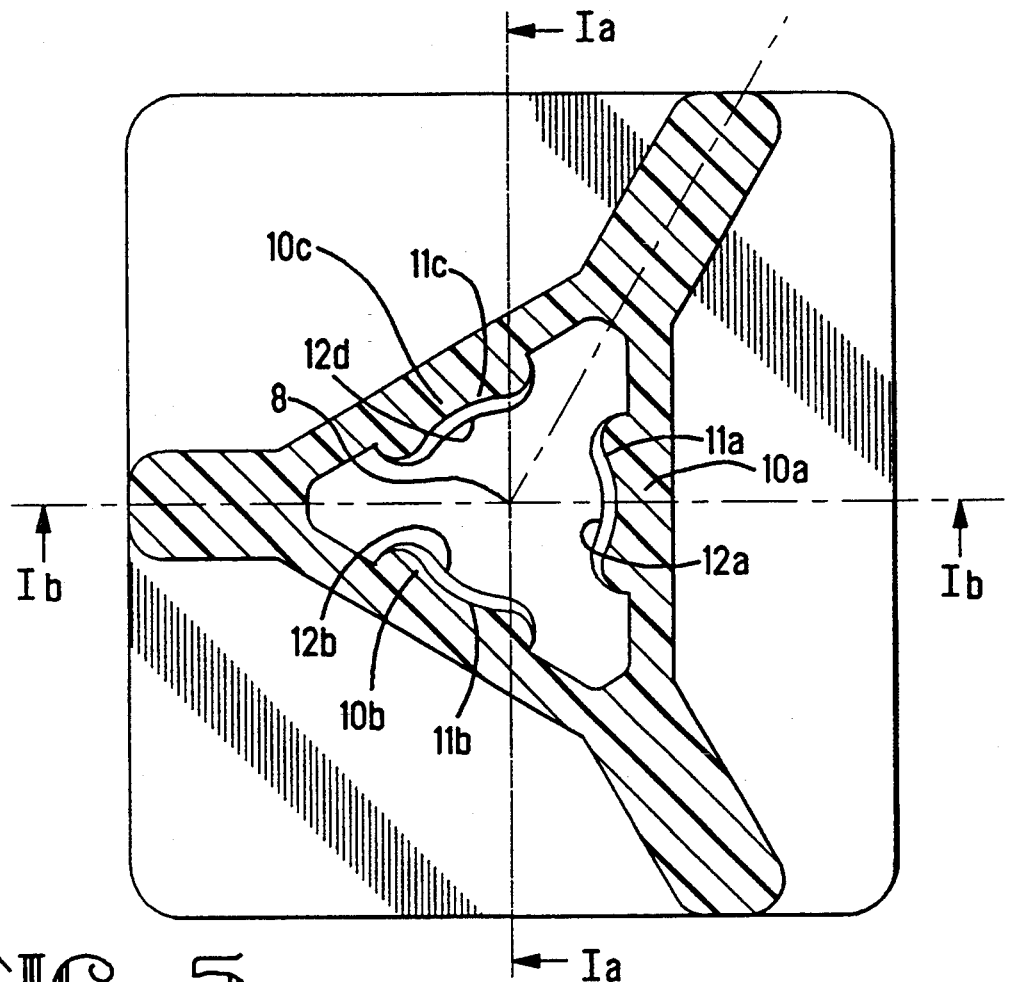
FIG. 5 shows a cross-sectional view of the terminating sleeve of FIG. 2 along sectional line II—II.

FIG. 1 shows a plan view of a terminating sleeve 1 according to the invention prior to being supplemented by assembly of a locking clevis or strap (not shown) so as to form a terminating member. Terminating sleeve 1 has in essence three partial regions, namely a hollow cylindrical part 2 on its left-hand mating side end in FIG. 1, which hereinafter is also referred to as terminating end, a locking clevis receiving part 3 on its right-hand end in FIG. 1 on the OWG insertion side, as well as a central part 4 located therebetween.

The structure of the locking clevis receiving part 3 is already elucidated in the afore-mentioned prior patent application P 41 06 594.8 and in particular in P 41 41 009.2, so that reference is made thereto in this respect.

FIG. 2 shows a longitudinal sectional view of the terminating sleeve 1 depicted in FIG. 1, as seen along sectional line I—I. The direction of this section is marked Ia—Ia in FIG. 5. The sleeve body of the terminating sleeve 1 is made of a transparent material of optical grade, e.g. polycarbonate or polymethylmetacrylate (PMMA), and preferably also of the same material as the OWG when the OWG is made of plastics material. Terminating sleeve 1 has at its terminating end a coupling face 5 of an optical coupling means 6, which in the first embodiment has a convexly curved optical surface 61. In this embodiment of the terminating sleeve 1, the optical coupling face 5 is formed with an annular groove 7 surrounding the convexly curved surface 61 such that a circumferential rib 71 is formed projecting in axial direction beyond the convexly curved surface 61. Circumferential rib 71 thus protects the convexly curved surface 61 and may also have a positioning function.

For facilitating insertion of the OWG from the OWG insertion end of the terminating sleeve 1 into an OWG receiving channel 8 arranged in the terminating sleeve 1 substantially in longitudinal direction, the inner surface of the OWG receiving channel 8 is provided in a preferred embodiment with a positioning means in the form of an insertion centering means 9. Insertion centering means 9 in a particularly preferred embodiment consists of three guide ribs 10a, 10b, 10c which are evenly spaced apart in the direction of the circumference of the OWG receiving channel 8 and arranged in parallel in the OWG receiving channel 8 in the longitudinal direction and whose radial distance from the longitudinal axis of the OWG receiving channel 8 decreases towards the terminating end of the terminating sleeve 1 so that upon insertion of an OWG in the OWG receiving channel 8, lateral play of the OWG being inserted decreases as the insertion operation progresses, until the inserted OWG abuts the side 62 of the optical coupling means 6 facing towards the OWG insertion end while being substantially radially centered. Between the inserted OWG and side 62 of the optical coupling means 6 facing towards the OWG insertion end, there is preferably disposed a matching gel (not shown) having preferably the same refractive index as the OWG material. The contact gel ensures a reliable optical coupling effect between OWG and optical coupling means 6. Excess contact gel may flow off to the rear in the interstices 13 left between ribs 10.

FIG. 3 shows a longitudinal sectional view of the terminating sleeve 1 illustrated in FIG. 1, as seen along connecting line I—I, with the sectional plane being rotated by 90° with respect to that of FIG. 2. This sectional view shows two ribs 10a, 10b of the in total three guide ribs 10 provided. The direction of this section is marked Ib—Ib in FIG. 5.

FIG. 4 shows a plan view of the terminating end of the terminating sleeve 1 depicted in FIG. 1, showing the convex surface 61, the annular groove 7 and the circumferential rib 71.

FIG. 5 shows a cross-sectional view of the terminating sleeve 1 depicted in FIG. 1 as seen along sectional line II—II. The three guide ribs 10a, 10b, 10c are arranged in evenly spaced apart manner on the wall of the OWG receiving channel 8. Steps 11a, 11b, 11c and 12a, 12b, 12c provide a clearance for the OWG to be inserted, which becomes smaller towards the terminating end of terminating sleeve 1.

Figure 6:
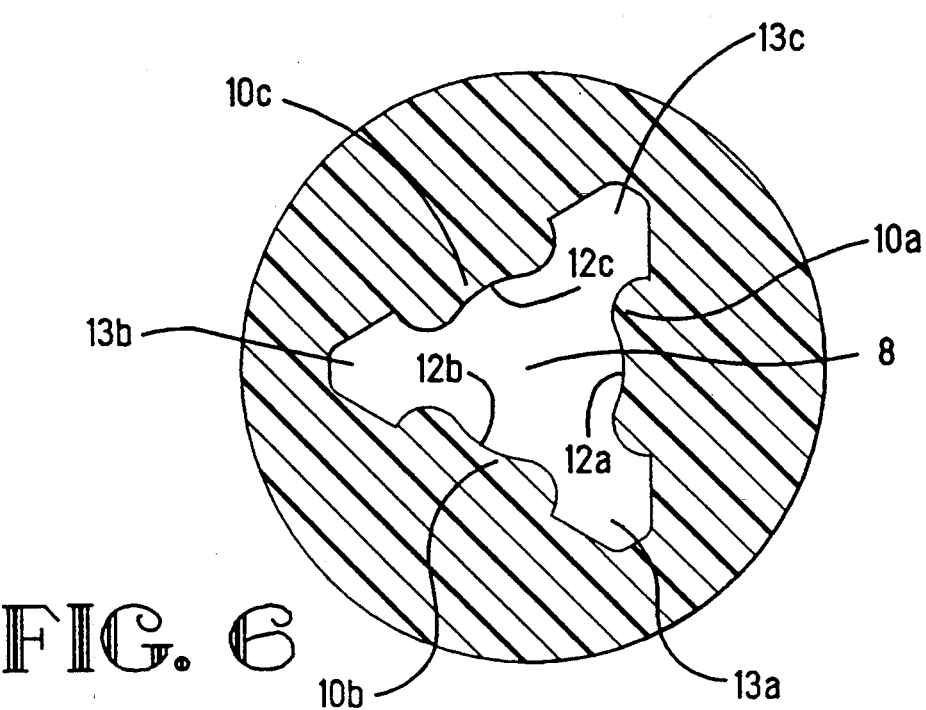
FIG. 6 shows a cross-sectional view of the terminating sleeve of FIG. 2 along sectional line III—III.

FIG. 6 shows a cross-sectional view of the terminating sleeve 1 illustrated in FIG. 2, as seen along sectional line III—III. Excess contact gel (now shown) can flow off through the cavities 13a, 13b, 13c left between guide ribs 10a, 10b, 10c, in the direction towards the OWG insertion end of terminating sleeve 1.

Figure 7:
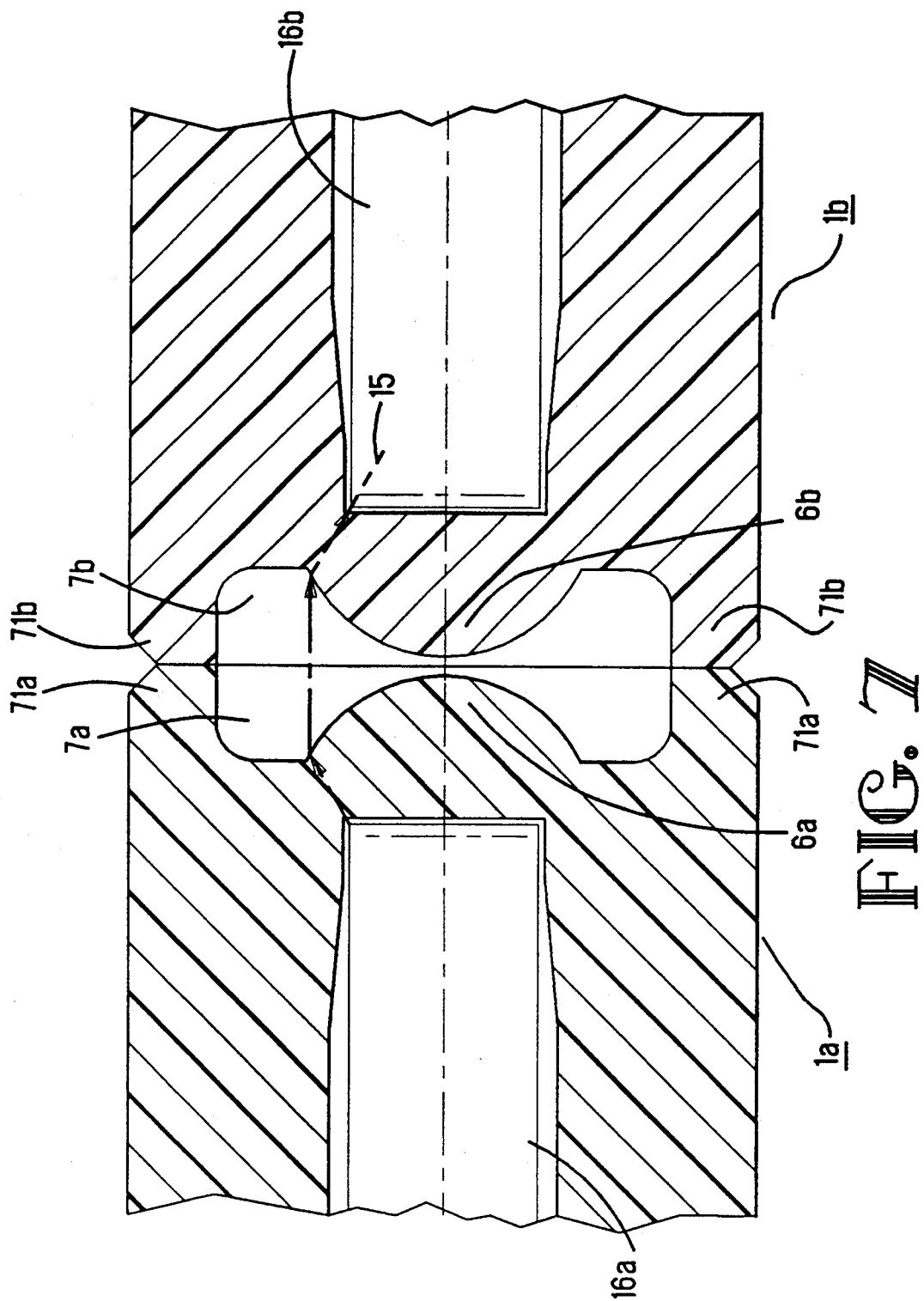
FIG. 7 shows a longitudinal sectional view of two terminating sleeves confronting each other at their respective terminating ends.

FIG. 7 shows a longitudinal sectional view of two terminating sleeves 1a, 1b confronting each other with their respective terminating end. The air gap space formed between the terminating sleeves 1a, 1b in the form of the abutting annular grooves 7a, 7b has the effect that e.g. the beam 15 of light leaving the terminating sleeve 1a is coupled in a large range of angles into the terminating sleeve 1b and the OWG 16b disposed therein. The abutting circumferential ribs 71 prevent that the convexly curved surfaces 6a, 6b are subject to mechanical damage due to frictional effects between the opposing surfaces.

The afore-described first embodiment of the terminating sleeve according to the invention distinguishes itself in that the optical coupling means 6, the adjoining positioning means with the guide ribs 10a, 10b, 10c, and the remainder of the terminating sleeve 1 are combined to form an integral component part consisting of transparent material of optical grade. In most cases, an as good as possible permeability of the light waves through the optical coupling means 6 is desired. In these cases the component part is made of highly transparent material. For obtaining e.g. a filter effect, the transparent material may also be dyed.

In the above-described first embodiment the optical coupling means 6 has a convexly curved surface 61 on the side directed towards the terminating end of the terminating sleeve 1. This provides the optical effect of a convex lens as outlined in FIG. 7 by a light beam 15.

However, it is also possible to provide other optical effects by a different design of the optical coupling means 6 directed towards the terminating end. For example, this surface may be a concavely curved surface, e.g. when the optical area of a complementary connector has a larger diameter than the optical coupling means 6, e.g. in case of an optical coupling with a light-emitting diode or a phototransistor in the complementary connector.

The surface of the optical coupling means 6 located at the terminating end of terminating sleeve 1, however, may also be a planar surface oriented either perpendicularly to the OWG axis or at an angle thereto. An inclined planar surface may be used when reflections of the light coming from the OWG are to be avoided or at least reduced on the planar surface.

A second embodiment of a terminating sleeve according to the invention, whose optical coupling means is provided on both sides with a planar surface disposed perpendicularly to the OWG longitudinal axis, is illustrated in FIG. 8. As for the rest, this embodiment is identical with the first embodiment shown in FIGS. 1 to 7.

In the two preceding embodiments the entire integral terminating sleeve is determined with respect to the optical function of the surface of the optical coupling means 6 facing the terminating end of the terminating sleeve. In case it is necessary for different fields of application to have terminating sleeves with a different optical function of their optical coupling means, a corresponding number of different terminating sleeves is necessary. Moreover, the entire terminating sleeve must be made of transparent or even highly transparent material of high optical grade.

An improvement in this respect is achieved by a third embodiment of a terminating sleeve 91 according to the invention is shown in FIG. 9. This terminating sleeve is a two-piece member and comprises a sleeve body 91 and a component 92 attached thereto by means of a latching connection. Component 92 contains, in integrally formed manner therewith, an optical coupling means 6 and a positioning means 93 following the optical coupling means 6 towards the OWG insertion end and serving for radially centering an inserted OWG. The inner space of the positioning means 93 constitutes a continuation of the OWG receiving channel 8. Positioning means 93 may either be formed with guide ribs (not shown in FIG. 9) corresponding or similar to the guide ribs 10a, 10b, 10c of the first two embodiments. Or the inner wall of the positioning means 93 may itself effect radial centering. In that event the inner diameter of the positioning means 93 may converge towards the optical coupling means 6 so that an inserted OWG, with increasing distance to the optical coupling means 6, is centered in increasingly exact manner. However, positioning means 93 may also be used for axially positioning the OWG by fixing the OWG in axially non-slidable manner in the positioning means 93.

In the embodiment shown in FIG. 9, latching takes place between component 92 and sleeve body 91 with the aid of latching projections 94 projecting outwardly from component 92 in radial direction, as well as complementary latching recesses 95 in sleeve body 91. In case of latching recesses 95 extending through the entire wall of the sleeve body 91, preferably a plurality of latching projections 94 and latching recesses 95 are distributed about the circumferences of component 92 and sleeve body 91. When the latching recess 95 does not extend completely through the wall of sleeve body 91, it may be designed as a latching groove extending about the inner circumference of the sleeve body 91, and component 92 may be provided with a corresponding latching flange extending about the outer circumference thereof. This allows particularly simple mounting of the component 92 within the sleeve body 91, since this kind of mounting is possible in any relative rotational position between component 92 and sleeve body 91.

In the embodiment shown in FIG. 9, only the component 92 with the positioning means 93 and the optical coupling means 6, having a concavely curved surface in the embodiment shown in FIG. 9, need be made of transparent material of optical grade. The sleeve body 91 may be made of an arbitrary other material, with the optical properties having no relevance.

In the embodiment according to FIG. 9, various components 92 with different coupling surfaces of the optical coupling means 6 and/or of different transparent materials can be kept in stock, whereas only single type of sleeve body 91 is necessary. The particular modification of the component 92 desired for a particular application is then inserted into the sleeve body 91.

Of course, there are also other types of connections possible between sleeve body 91 and component 92 than the latching connection shown in FIG. 9. Examples in this respect are an adhesive connection, a welding connection, a friction-type connection, and a threaded connection.

Figure 10:
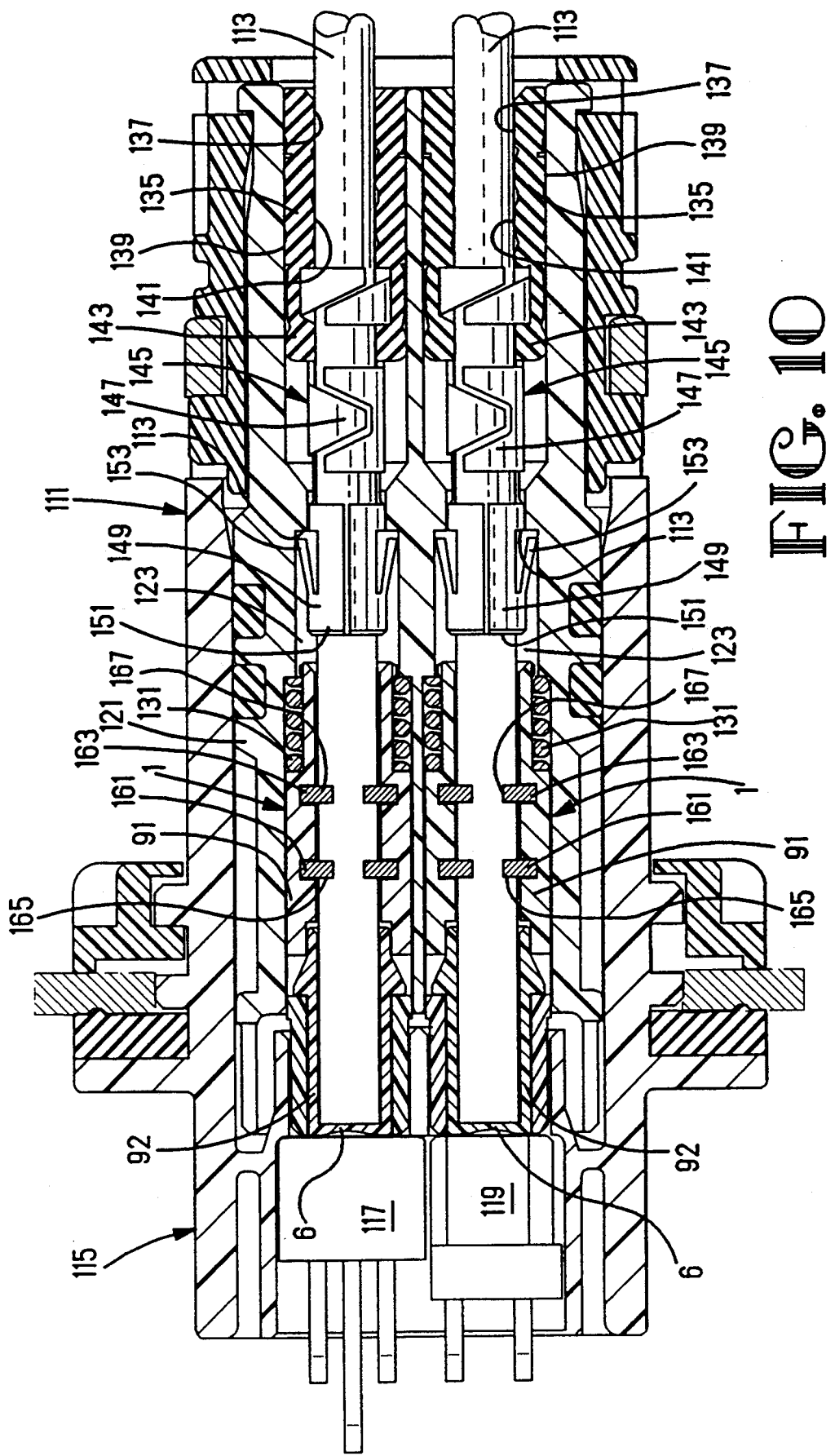
FIG. 10 shows a longitudinal sectional view of a connector assembly comprising two pluggable connectors, one thereof being provided with two terminating sleeves of the type shown in FIG. 9.
Figure 11:
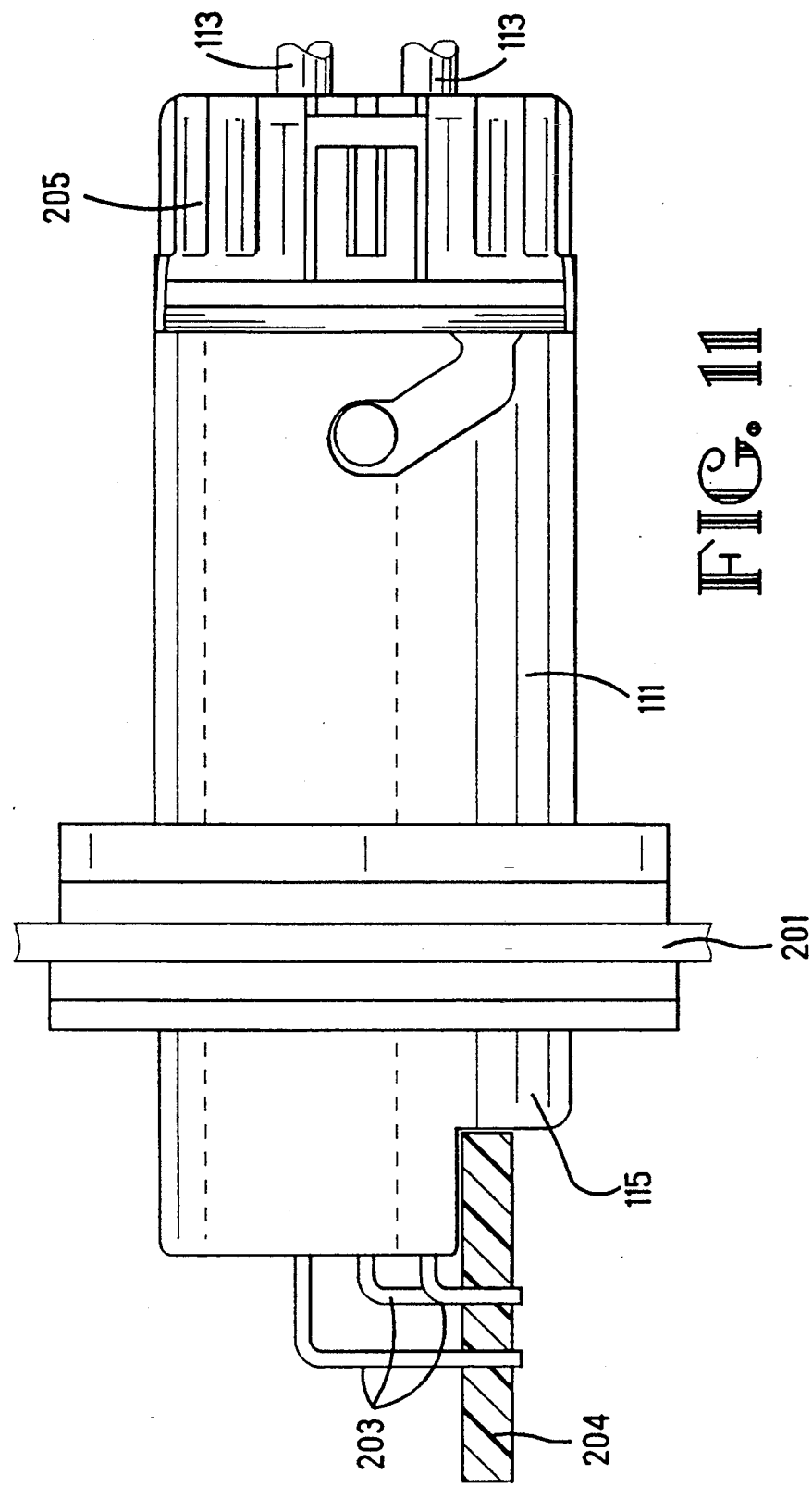
FIG. 11 shows a longitudinal side view of the connector assembly according to FIG. 10

FIGS. 10 and 11 show a longitudinal sectional view and a longitudinal side view, respectively, of an OWG connector assembly employing two terminating sleeves of the type shown in FIG. 9, although it should be understood that the embodiments of FIGS. 1–8 could also be used. Apart from differences in conjunction with the terminating sleeves, the connector assembly shown in FIG. 10 corresponds to that OWG connector assembly which is shown in FIG. 1 of the initially cited prior application P 41 41 009.2 of the same applicant. As regards the exact description and elucidation, reference is thus made to this prior patent application whose disclosure is herewith being made subject matter of the present application by making reference to said prior application. In the following brief description of the connector assembly illustrated in FIG. 10, the same reference numerals as used in FIG. 1 of said prior application, but each increased by 100, are used for providing an easier comparison.

The optical waveguide connector assembly shown in FIG. 10 in a longitudinal sectional view comprises a pluggable connector 111 terminating two OWGs 113, and a complementary pluggable connector 115 accommodating a phototransistor 117 and a light-emitting diode (LED) 119. Connector 111 comprises a connector housing 121 having two juxtaposed through-channels 123 extending therethrough. In the mating side end of each through-channel 123 located opposite the complementary connector 115, there is located a terminating sleeve 1 according to the invention. In the OWG receiving channel 8 thereof there is inserted the end of one of the two OWGs 113. At the end of each terminating sleeve 1 remote from said complementary connector 115, there is located one end of a coil spring 131 which at the other end is supported on a radial shoulder 113 in the respective through-channel 123.

An OWG insertion side opening of the connector 111 has inserted therein, at its end opposite the mating side, a strain relieving plug 135 having at the same time the function of a sealing plug. Extending through the strain relieving plug 135 are two OWG channels 137 through which the OWGs 113 extend. Strain relieving plug 135 has radial outer beads 139 projecting from the outer circumference thereof and radial inner beads 141 projecting into the OWG channels 137. The outer beads 139 and the inner beads 141 effect sealing of the OWG 113. At its end facing the mating side, the strain relieving plug 135 is provided with two cylinder-like sockets 143, the interiors thereof constituting a continuation of the OWG channels 137.

The OWGs 113 have an optical waveguide core surrounded by a cladding provided for improving the optical waveguiding properties of the OWG. The cladding is surrounded by a protective plastics jacket. In the FIG. 10 embodiment of an OWG connector assembly with two-piece terminating sleeves according to FIG. 9, the plastics jacket together with the OWG surrounded by the latter extends up to the side 62 of the optical coupling means 8 of terminating sleeve 1 facing the OWG insertion end.

In the region between coil spring 131 and strain relieving plug 135, each OWG 113 has a crimping barrel 145 provided thereon. Each crimping barrel 145 has a first crimping region 147 crimped about the associated socket 143 of the strain relieving plug 135 and a second crimping region 149 crimped about the adjacent portion of the OWG 113. At an end facing coil spring 131, each crimping barrel 145 is provided with a cylindrical locking portion 151 from whose diametrically opposed sides one locking lance 153 each projects obliquely towards the second crimping region 149. The locking lances 153 cooperate with a correspondingly positioned radial locking shoulder 155 in the associated through-channel 123.

In particular when the connector assembly and the OWGs 113 are to be accommodated in an environment subject to mechanical shocks, vibrations etc., e.g. in motor vehicles, the light-conducting cores of the OWGs 113 also consist of plastics material, preferably acrylic glass.

For safe retention of the OWG 113 in the terminating sleeve 1 after full insertion thereof in the OWG receiving channel 8, there is provided a fibre cable gripping member shown as a substantially U-shaped locking clevis or strap whose legs are constituted by two locking forks, namely a mating side locking fork 161 and an OWG insertion side locking fork 163. The two locking forks 161 and 163 each extend perpendicularly from a web of the locking clevis, said web extending parallel to the longitudinal axis of OWG 113. Each locking fork 161, 163 has a clamping slot for clamping the locking fork 161 or 163 on the plastics jacket of the OWG 113. The two locking forks 161 and 163 are each seated in a mating side fork receiving opening 165 and an OWG insertion side fork receiving opening 167, respectively.

In the manner elucidated in more detail in afore-mentioned P 41 41 009.2, the effect achieved by means of the coil spring 131 is that the OWG 113 is always urged against the opposing side 62 of the coupling means 6 and that the coupling face 5 of the terminating sleeve 1 is always urged in optimum manner against the associated optoelectronic or optical component.

In the side view of FIG. 11, depicting an OWG connector assembly according to FIG. 10, connector 111 and complementary connector 115 are in known manner attached to a housing wall 201 having a through-opening 202 therein for the housing of the complementary connector 115. Terminal legs 203 of the complementary connector 115, which are preferably constituted by terminal legs of optoelectronic components accommodated in the complementary connector 115, are connected to a circuit board 204. Connector 111 has on the OWG insertion side a covering hood 205 connected to the housing of connector 111 by means of a bayonet-type coupling.

Figure 15:
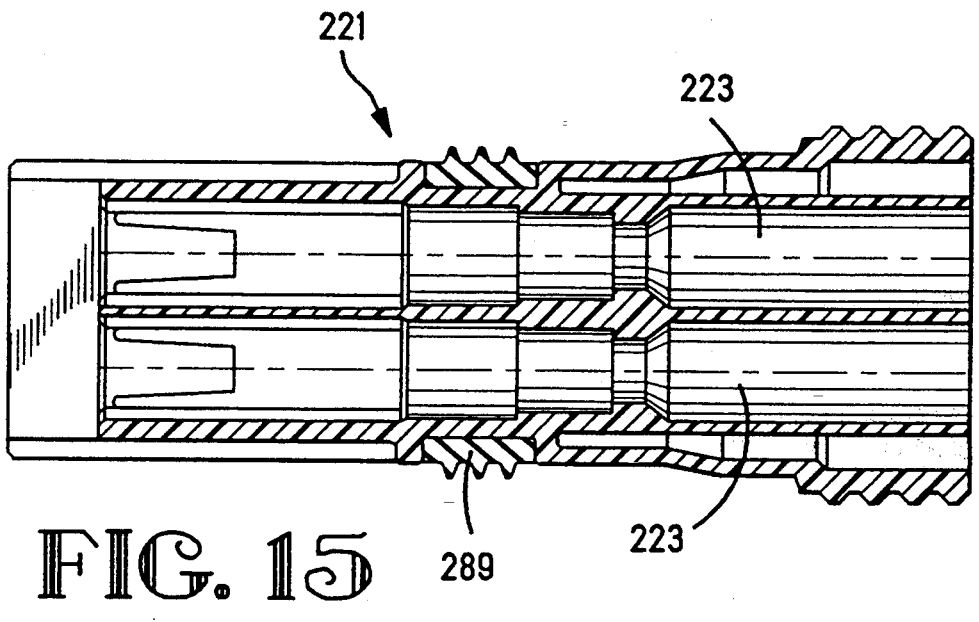
FIG. 15 and 16 show a cross sectional view through the connector housing of FIG. 14.
Figure 16:
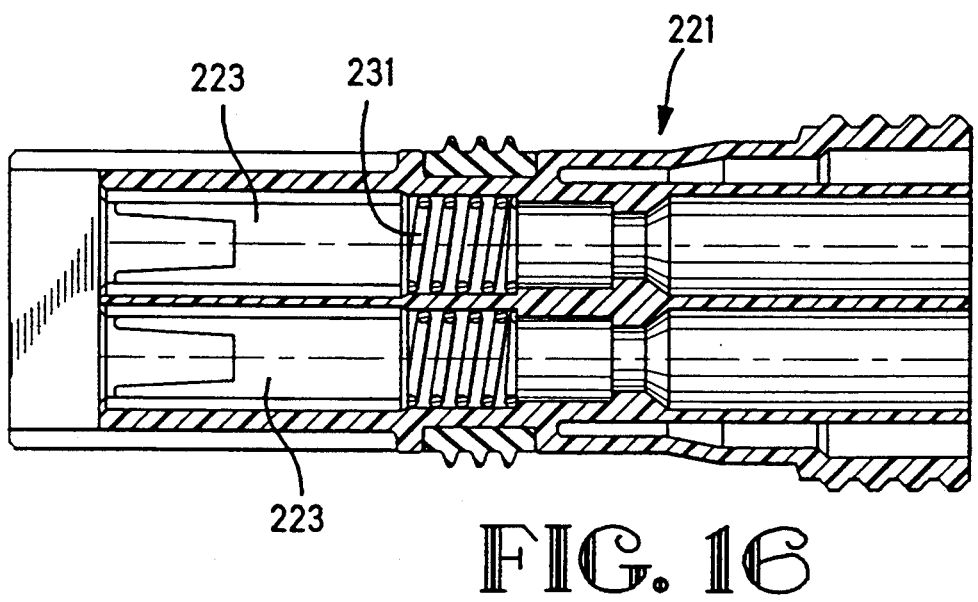
Figure 17:
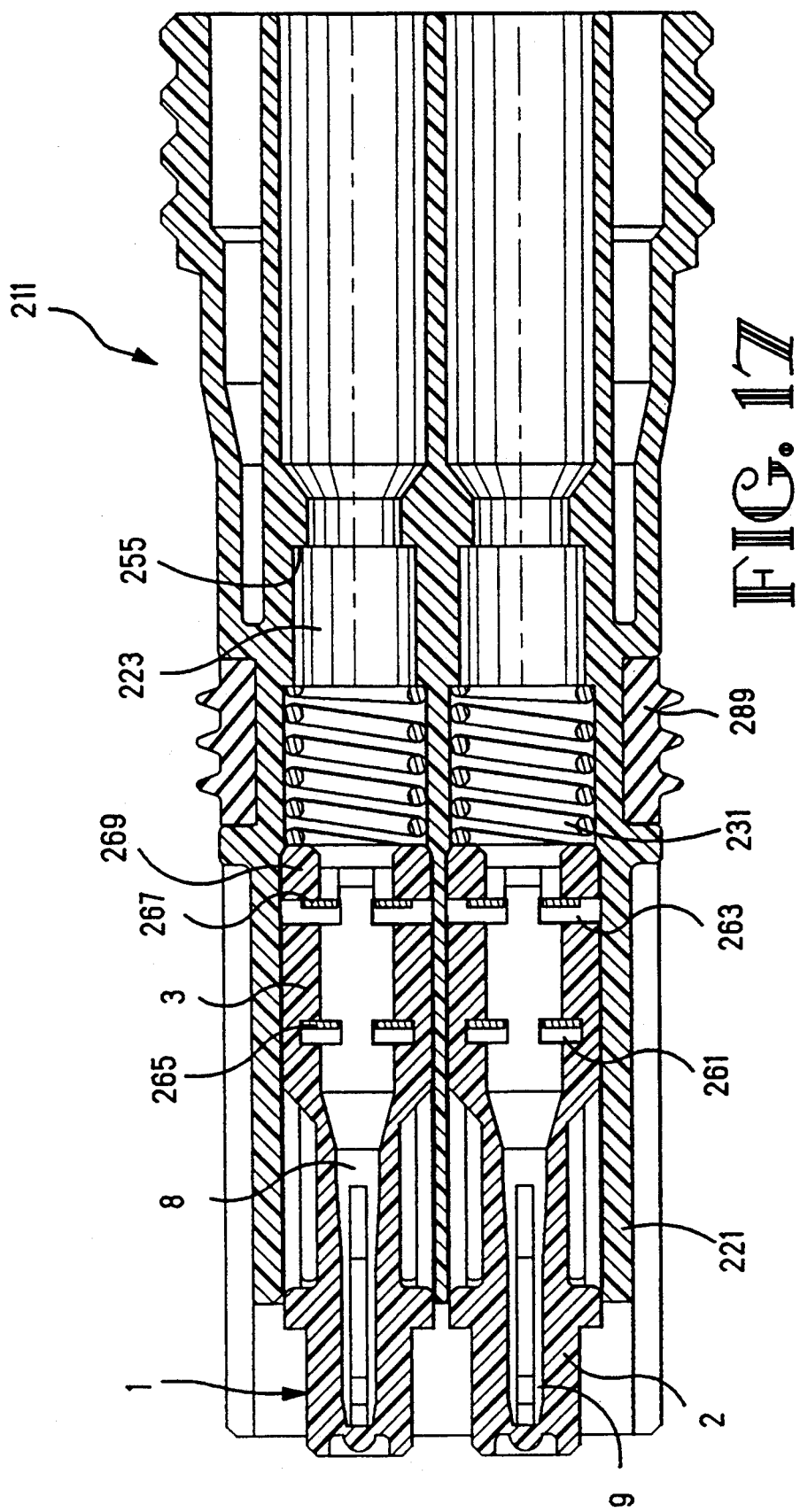
FIG. 17 show the connector housing of FIGS. 14-16 with the fibre inserts of FIGS. 1-7 positioned therein.

In the embodiment illustrated in FIG. 10, the OWGs 113 are each optically coupled with an optoelectronic component via the associated terminating sleeves 1. However, the terminating sleeves 1 can also cooperate with a complementary connector which also terminates OWGs. In this case the terminating sleeve 1 can be inserted in a housing body member 221, similar to that shogun in FIG. 15. FIG. 15 shows a longitudinal sectional view through the connector housing 221 of connector 211, with said housing being provided merely with a sealing collar 289 on its outer circumference. FIG. 16 shows an assembly phase in which a coil spring 231 is inserted in each of the two through-channels 223. A terminating sleeve according to FIG. 1 is inserted next into each through-channel 223, as illustrated in FIG. 17.

Figure 12:
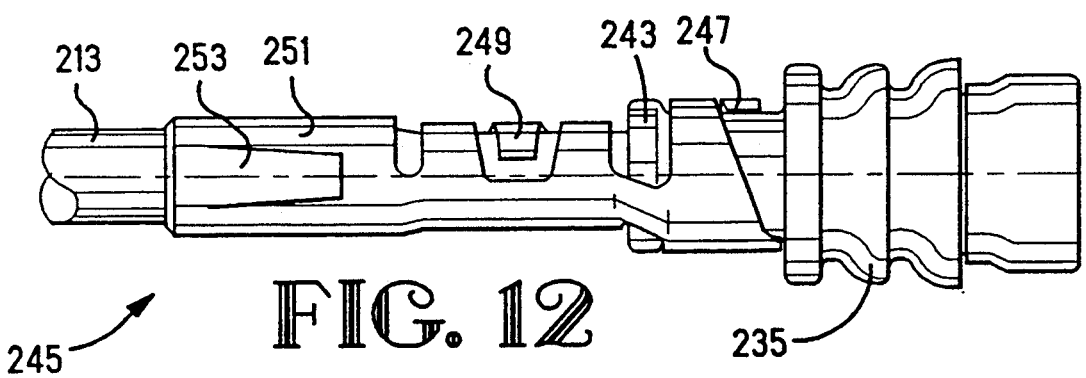
FIGS. 12 and 13 show longitudinal side views, offset by 90°, of a crimping barrel crimped to an OWG and to a strain relief means.
Figure 13:
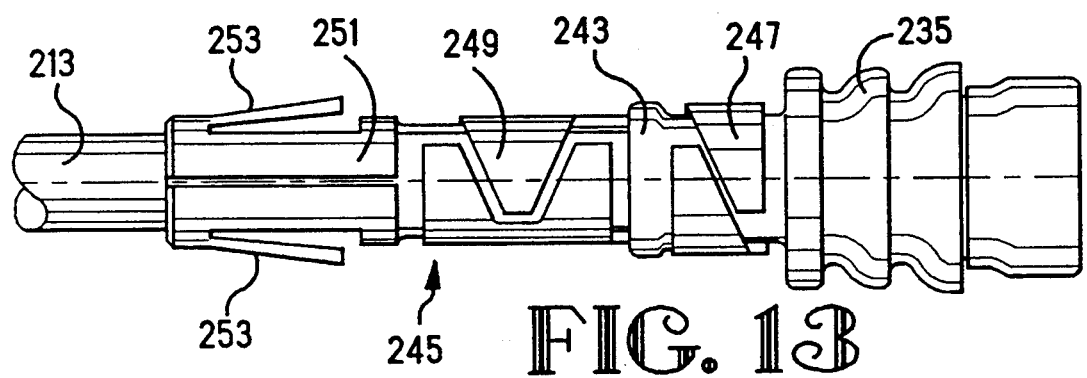
Figure 14:
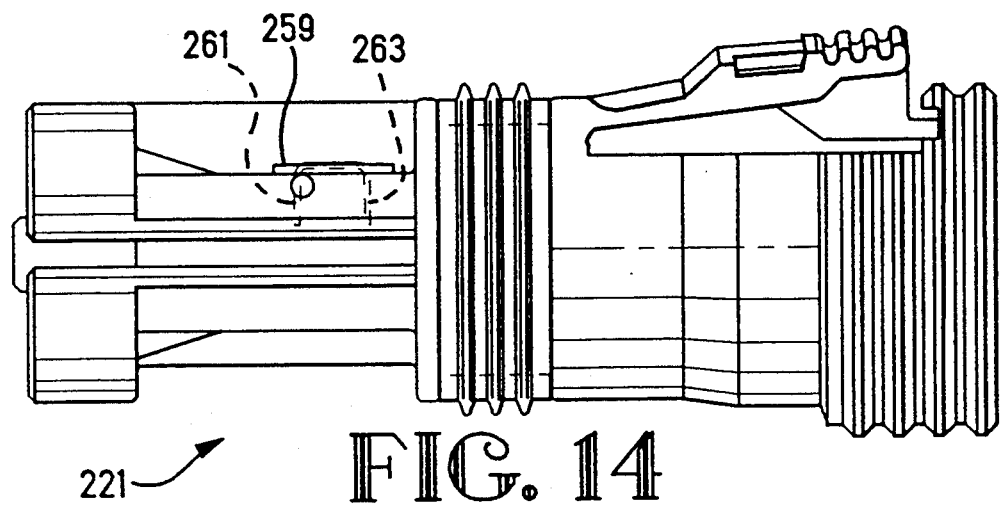
FIG. 14 shows a side plan view of a connector housing for receipt of a ferrule member according to any of the embodiments of FIGS. 1-7, 8 or 9.

An OWG is first inserted through a strain relieving plug 235 and through a crimping barrel 245, as shown in FIGS. 12 and 13. Strain relieving plug 235 has radial outer beads projecting from the outer circumference thereof and radial inner beads projecting into the OWG channels. The outer beads and the inner beads effect on the one hand sealing and on the other hand retention of the OWGs 213 in the strain relieving plug 235. At its end facing the mating side, the strain relieving plug 235 is provided with cylinder-like sockets 243, the interiors thereof constituting a continuation of the OWG channels.

The crimping barrels 245 have several functions. On the one hand they hold the strain relieving plug 235, which at the same time serves as sealing plug, in the connector housing 221. On the other hand they hold the associated OWG 213 in a specific position within connector housing 221. Furthermore, they effect strain relief for OWG 213. Pulling at the end of OWG 213 extending out of the connector housing 221 is taken up by the strain relieving plug 235 on the one hand and by the locking lances 253 on the other hand.

The OWGs 213 have an optical waveguide core surrounded by a cladding provided for improving the optical waveguiding properties of the OWG. The cladding is surrounded by a protective plastics jacket. The plastics jacket is removed only from a front part of the end of the OWG 213 for disposition in the terminating sleeve 1 of FIG. 1, whereas the OWG 213 on the remaining length thereof is enclosed by the plastics jacket.

During assembly, locking clevis 259 preferably is brought first into a pre-assembled position in which it is not yet completely pressed into the terminating sleeve 1, but still projects partly into the connector housing. When OWG 213 is then introduced into the terminating sleeve 1 until it hits OWG section 229, locking clevis 259 is urged into a final assembly position in terminating sleeve 1 in which the two locking forks 261, 263 engage the plastics jacket of OWG 213. In doing so, locking clevis 259 is positioned such that the locking forks 261 and 263 thereof are seated in the fork receiving openings 265 to 267 in such a manner that the locking forks 261 and 263 still have a possibility to move in the direction of the longitudinal axis of OWG 213 towards OWG section 229.

Each locking fork 261, 263 has a clamping slot for clamping the locking fork 261 or 263 on the plastics jacket of OWG 213. The two locking forks 261 and 263 are each seated in a mating side fork receiving opening 265 and an OWG insertion side fork receiving opening 267, respectively, as shown in FIG. 17. The two fork receiving openings 265 and 267 are dimensioned so as to permit, to a predetermined extent, movement play of the locking forks 261, 263 and thus of the locking clevis 259 in the longitudinal direction of the OWGs.

The OWG insertion side end of the terminating sleeve 1 is provided in the form of an actuating ram 269 that is longitudinally movable relative to the remainder of the terminating sleeve 1, and is integrally connected to the locking clevis receiving part 3 and thus to the sleeve body 1 consisting of plastics material. The resilient connection between locking clevis receiving part 3 and actuating ram 269 is such that the actuating ram 269 is resiliently movable relative to the locking clevis receiving part 3 in the direction of the longitudinal axis of the sleeve body. Between the mating side end of the actuating ram 269 and the opposite end of the stationary part of the terminating sleeve 1 there is formed a gap constituting the OWG insertion side fork receiving opening 267.

FIGS. 3 and 17 shows in particularly distinct manner the construction of the actuating ram 269 and its connecting web for resilient connection to the locking clevis receiving part 3. As shown in FIG. 17, the latter is of such a width that it can be engaged by coil spring 231. The mating side end of the actuating ram 269, when urged against the locking clevis receiving part 3, engages the OWG insertion side locking fork 263 when the locking clevis 259 is inserted in the locking clevis receiving part 3.

When the two opposing face sides of surface 62 and OWG 213 are not yet abutting each other at that time, the spring pressure exerted on locking clevis 259 by coil spring 231 via actuating ram 269 has the effect that the locking forks 261 and 263 positioned on the plastics jacket of OWG 213, in accordance with the movement play permitted to them by the fork receiving openings 265 and 267, perform a movement towards surface 62 along with a concomitant movement of OWG 213. For definitely obtaining abutment of the opposing end faces of surface 62 and OWG 213, the two fork receiving openings 265 and 267 must have a correspondingly large width in the axial direction of the OWG 213.

When the movement of the locking clevis 259 relative to the terminating sleeve 1, which movement is effected by coil spring 231, has caused abutment of surface 62 and OWG 213 against each other, the pressure of coil spring 231 has the effect that the entire terminating sleeve 1 is urged in the direction towards the mating side end of connector 211. The effect achieved by this movement is that the mating end of the terminating sleeve 1 is always urged into abutment with the mating component, either another like connector or with an opposing optoelectronic component in the form of phototransistor 217 or LED 219. In the manner according to the invention, it is achieved by means of one single coil spring 231 that both the surface 62 and the OWG 213 are always urged against each other, and that the mating end of the terminating sleeve 1 are always urged in optimum manner against the mating component.

After insertion of the OWGs 213 in the OWG receiving channels 8 of sleeve bodies 1, the locking clevises 259 are preferably pressed onto the respective OWG 213 in such a manner that the locking forks 261 and 263 still have movement play in the direction towards the mating side limit of the fork receiving openings 265 and 267 so that the end face of the OWG 213 can still be urged against the insertion end 62 with the aid of the pressure force of the coil springs 231 if this has not yet been achieved during insertion of the OWGs 213 in the connector housing 221 and the sleeve bodies 271.

When the locking clevis 259 is in a pre-assembled position in which locking forks 261 and 263 are already inserted partly in the fork receiving openings 265 and 267, due to the fact that an OWG 213 has not yet been inserted which could abut against the insertion end 6.2, the locking clevis 259 is urged by coil spring 231 so as to abut the mating side limit of the fork receiving opening 265 and 267, respectively. Upon insertion of the OWGs 213 in the two through-channels 223, the locking clevises 259 are slightly shifted back in the direction towards coil springs 231 against the pressure of said coil springs 231 before they are brought into their final assembly position and are thus clamped onto the plastics jacket of the respective OWG 213. This provides the possibility that the locking clevises 259 and the respectively associated OWGs 213 can still be urged by the associated coil spring 231 in the direction towards the insertion end 62 should this be necessary.

Figure 18:
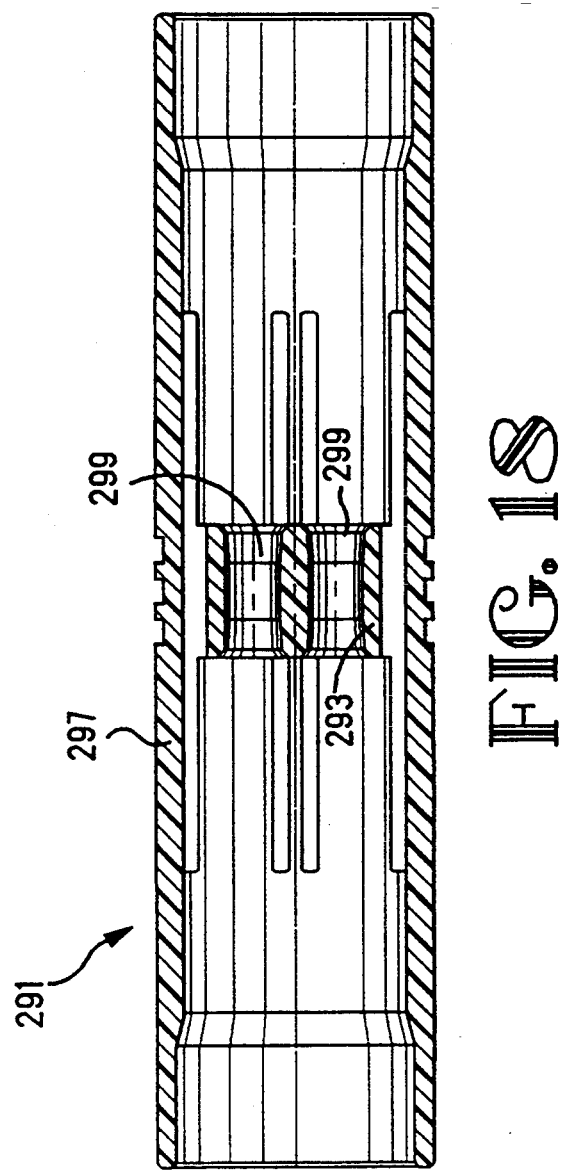
FIG. 18 shows an outer shell housing which is capable of receiving two connectors as shown in FIG. 17.

A cross-sectional view of a housing sleeve 291 is shown in FIG. 18, which allows the interconnection of two connectors such as 211. Within the tubular outer wall 297 one can see centering means 293 having two centering receiving chambers 299. The two portions of the respectively abutting pair of terminating sleeves 1, which portions protrude from the respectively associated connector housing 221, project into the respective one of the two centering receiving chambers 299. The effect achieved by means of the centering receiving chambers 299 is that these protruding portions of the two abutting terminating sleeves 1 are held in alignment with each other with respect to their optical axis. This is desired for keeping light losses at the transition between the two optical end faces as low as possible.

Figure 19:
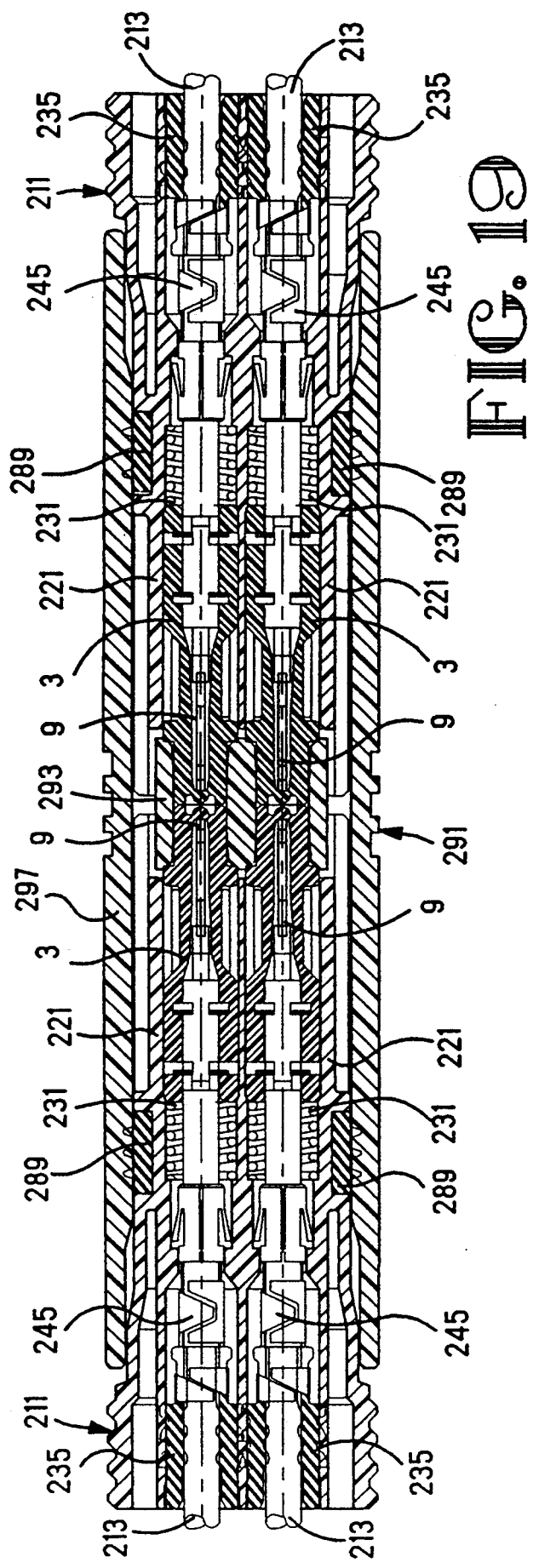
FIG. 19 shows two connectors of FIG. 17 installed in the outer shell housing of FIG. 18.

FIG. 19 illustrates, the assembled view of connectors 211 connected to each other, terminating a pair of optical waveguides 213, with the terminating sleeves 1 of the two connectors 211 having their end faces located opposite one another. The two connectors 211 are held to each other by means of the housing sleeve 291. Each of the two connectors 211 is provided on its circumference with an annular seal 289 which sealingly engages an outer wall 297 of housing sleeve 291. Preferably, the connectors 211 have latching means which cooperate with latch members in the outer shell 291, to retain the connectors 211 in position.

In the region between coil spring 231 and strain relieving plug 235, each OWG 213 has a crimping barrel 245 provided thereon. Each crimping barrel 245 has a first crimping region 247 (FIG. 12) crimped about the associated socket 243 of the strain relieving plug 235 and a second crimping region 249 crimped about the adjacent portion of the OWG 213. At an end facing coil spring 231, each crimping barrel 245 is provided with a cylindrical locking portion 251 from whose diametrically opposed sides one locking lance 253 each projects obliquely towards the second crimping region 249. The locking lances 253 cooperate with a correspondingly positioned radial locking shoulder 255 in the associated through channel 223.

For being able to accommodate thermal expansions, the free ends of the locking lances 253 under normal conditions have a predetermined spacing from the locking shoulders 255. When thermal expansion takes place in which OWG 213 is moved towards the OWG insertion side end of the connector housing 221, the locking lances 253 and thus the OWG 213 still have movement play until the free ends of the locking lances 253 hit the locking shoulders 255, thereby compressing coil spring 231. When cooling takes place thereafter, coil spring 231 takes care that OWG 213 is moved again in the direction towards the mating side end of the connector housing 221.

We claim:

1. An optical waveguide (OWG) terminating sleeve assembly usable for OWG connectors, comprising a terminating sleeve having an OWG insertion end and a terminating end opposite thereto, and an axially extending OWG receiving channel open at the OWG insertion end, the OWG receiving channel being closed in the region of the terminating end by an optical coupling means serving to transmit light onwards from an OWG end located in said OWG receiving channel through the terminating end of the terminating sleeve, characterized in that said terminating sleeve includes a receiving part, and the assembly further includes a fibre cable gripping member floatably positioned in said receiving part and adapted for gripping onto an outside jacket of a fibre cable to be terminated, and a resilient member biasing the gripping member to ensure abutting contact between an inner surface of said closed region, and said OWG.

2. An OWG terminating sleeve assembly according to claim 1, characterized in that the terminating sleeve and said optical coupling means are formed integrally from a that is lower case "a" and underlined transparent material.

3. An OWG terminating sleeve assembly according to claim 1, characterized in that the optical coupling means is a separate component from the terminating sleeve and adapted to be mounted thereto.

4. An OWG terminating sleeve assembly according to claim 3, characterized in that only the optical coupling means consists of transparent material of optical grade.

5. An OWG terminating sleeve assembly according to claim 3, characterized in that the optical coupling means is adapted to be attached to the terminating sleeve by a latching connection.

6. An OWG terminating sleeve assembly according to any one of claims 1 to 5, characterized in that the optical coupling means includes a coupling face facing towards the terminating end that is constituted by a planar surface.

7. An OWG terminating sleeve assembly according to any one of claims 1 to 5, characterized in that the optical coupling means includes a coupling face facing towards the terminating end that is constituted by a concave surface, in particular a concave or a convex surface.

8. An OWG terminating sleeve assembly according to claim 7, characterized in that the coupling face can be surrounded by an annular shoulder projecting beyond said face.

9. An OWG terminating sleeve assembly of claim 1, characterized in that, positioning means are provided for radial centering of the OWG in the OWG receiving channel, said positioning means including several guide members which are evenly spaced apart in circumferential direction and are disposed parallel to each other in the longitudinal direction and whose radius decreases towards the optical coupling means.

10. An OWG connector having a connector housing for receipt of at least one OWG adapted to be coupled with an OWG, an optical component or an optoelectronic component, comprising at least one through-channel for an OWG extending in the longitudinal direction of the connector housing, characterized in that at least one terminating sleeve assembly is arranged in the connector housing, said terminating sleeve assembly comprising terminating sleeve having an OWG insertion end and a terminating end opposite thereto, and an axially extending OWG receiving channel open at the OWG insertion end, the OWG receiving channel being closed in the region of the terminating end coupling means serving to transmit light onwards from an OWG end located in said OWG receiving channel through the terminating end of the terminating sleeve, where said terminating sleeve includes a receiving part, and the assembly further includes a fibre cable gripping member floatably positioned in said receiving part and adapted for gripping onto an outside jacket of a fibre cable to be terminated, and a resilient member biasing the gripping member into abutting contact with an inner surface of said closed region.

11. The OWG connector of claim 10, characterized in that said housing contains a spring means for spring loading said termination sleeve forward.

12. The connector of claim 11, characterized in that said spring means also acts as the resilient member to spring load said cable gripping means.

13. The connector of claim 12, characterized in that said terminating sleeve includes an anvil section which abuts said gripping member, said spring means being positioned between said anvil member and a shoulder within said outer housing member.

14. The connector of claim 13, characterized in that said anvil section is integrally moulded to said terminating sleeve, being movable by a flexible web.

15. The connector of claim 14 characterized in that said outer housing includes an aperture coaxially aligned with said receiving channel.

16. The connector of claim 15, further including a fibre cable positioned in said channel, with an optic fiber end against said inner surface, said fiber including a sealing member positioned around said fiber and inserted in said aperture.

17. The connector of claim 16 further including an outer housing shell, said outer shell having centrally disposed centering means therein, for receiving a front section of said terminating sleeve, said outer shell being open ended at opposite ends, to accommodate two abutting connector members.

18. The connector of claim 17, characterized in that said outer housing has a peripheral seal therearound, which corresponds with an inner peripheral surface of said outer shell.

19. The connector of claim 18, characterized in that said seal is disposed rearwardly of said gripping member.

20. The connector of of claim 12, characterized in that the terminating end of the terminating sleeve is profiled as a lens.

21. The connector of claim 20, characterized in that said lens is convex.

22. The connector of claim 20, characterized in that said lens is concave.

23. The connector of claim 12, characterized in that the terminating end of the terminating sleeve is planar.

24. An optical waveguide (OWG) connector for optically coupling an optical fibre to be terminated therein with another optical device, said connector comprising a housing containing a terminating sleeve therein, the terminating sleeve having an OWG receiving end, a terminating end opposite thereto, and an OWG receiving channel for receiving the optical fibre therein that is open at the receiving end and closed at the terminating end by an optical coupling means that couples light between the fibre and the other optical device, and a resilient member acting between the housing and the terminating sleeve to spring load the terminating sleeve such that the optical coupling means is optically coupled with the other optical component, characterized in that the connector includes a gripping member for gripping the optical fibre when inserted therein and the resilient member also acts on the gripping member to bias the fibre into an optically coupled relation with the optical coupling means.

25. An optical waveguide connector according to claim 24 characterized in that the terminating end of the terminating member is held in a predetermined radial position in a centering means of a connector housing and the remaining portion of the terminating member is floatingly supported within the connector housing.

26. The optical waveguide connector of claim 24, characterized in that the optical coupling means is latchably coupled to the terminating sleeve.

27. The optical waveguide connector of claim 24, characterized in that the terminating sleeve is an integrally molded component of optical quality plastic.

28. An optical waveguide connector according to claim 24, characterized in that the terminating sleeve is provided with an actuating means which is movable relative to the sleeve body in the longitudinal direction of the optical waveguide receiving channel and which cooperates with the gripping member means in such a manner that movement of the actuating means in the direction towards the optical coupling means is transmitted to the gripping member.

29. An optical waveguide connector according to claim 24, characterized in that the gripping member comprises a locking fork which extends transversely of the longitudinal direction of the optical waveguide receiving channel, is adapted to be placed in a clamping fit onto an optical waveguide inserted in the optical waveguide receiving channel, and is received in at least one fork receiving opening whose dimension in the longitudinal direction of the optical waveguide receiving channel is larger than the thickness of the locking fork in such a manner that the locking fork has a margin of movement in the longitudinal direction of the optical waveguide receiving channel corresponding to the predetermined amount of movability.

30. A terminating device for receiving an optical waveguide adapted to be coupled to another optical component, the terminating device comprising a sleeve-like terminating sleeve having a sleeve body provided with an optical waveguide channel, closed at one end by an optical coupling means, the sleeve body comprising a sleeve tube having wall thicknesses such that it is resilient in its radial direction and having positioning means disposed within said channel along the resilient wall which are evenly spaced apart in the circumferential direction and are disposed along a longitudinal axis and whose radius decreases towards the optical coupling means for centering the waveguide, whereby the resilient walls exert a centering influence on the optical waveguide being inserted into the terminating device.

31. The terminating device of claim 30, further including a terminating end having a gripping member disposed therein for gripping the optical waveguide and retaining the waveguide within the sleeve tube.

32. The terminating device of claim 31, further comprising a biasing member acting against said gripping member to bias the optical waveguide into the reduced diameter portion between the positioning means.

33. The terminating sleeve of claim 30 wherein the terminating sleeve is formed of optically clear material.

34. The terminating device of claim 30, wherein the optical coupling means are latchably attached to the terminating sleeve.

35. The terminating device of claim 30 wherein the optical coupling means is a lens.

36. The terminating device of claim 30, wherein the optical coupling means is formed integrally with the terminating sleeve.

* * * * *